United States Patent
Samuelson et al.

(10) Patent No.: US 9,531,608 B1
(45) Date of Patent: Dec. 27, 2016

(54) ADJUSTING, SYNCHRONIZING AND SERVICE TO VARYING RATES OF ARRIVAL OF CUSTOMERS

(71) Applicant: QueLogic Retail Solutions LLC, Dallas, TX (US)

(72) Inventors: Douglas A. Samuelson, Annandale, VA (US); Jarrod R. Johnson, Dallas, TX (US); Benjamin J. Crew, Spring, TX (US)

(73) Assignee: QueLogic Retail Solutions LLC, Dallas, TX (US)

( * ) Notice: Subject to any disclaimer, the term of this patent is extended or adjusted under 35 U.S.C. 154(b) by 642 days.

(21) Appl. No.: 13/940,946

(22) Filed: Jul. 12, 2013

Related U.S. Application Data

(60) Provisional application No. 61/670,727, filed on Jul. 12, 2012, provisional application No. 61/673,896, filed on Jul. 20, 2012.

(51) Int. Cl.
  *H04L 12/26* (2006.01)
  *H04L 12/801* (2013.01)

(52) U.S. Cl.
  CPC ............. *H04L 43/08* (2013.01); *H04L 47/10* (2013.01)

(58) Field of Classification Search
  CPC  G06Q 10/06; G06Q 10/06315; G06Q 10/109; G07C 2011/04; H04M 3/5234; H04M 3/36; H04Q 3/66; H04Q 3/68
  USPC ................................................ 709/224, 223
  See application file for complete search history.

(56) References Cited

U.S. PATENT DOCUMENTS

| | | | |
|---|---|---|---|
| 4,858,120 A | 8/1989 | Samuelson | |
| 5,719,854 A * | 2/1998 | Choudhury | G06F 9/5027 370/231 |
| 5,923,873 A * | 7/1999 | Massey | G06F 9/50 718/100 |
| 7,319,479 B1 * | 1/2008 | Crabtree | G06K 9/00778 348/169 |

(Continued)

OTHER PUBLICATIONS

Lu et al., Measuring the Effectiveness of Queues on Customer Purchases., Fuqua School of Business., Duke University., May 24, 2011. https://faculty.fuqua.duke.edu/~amusalem/bio/deli_paper%200523_2011-%20post.pdf.*

*Primary Examiner* — Kostas Katsikis
(74) *Attorney, Agent, or Firm* — James Creighton Wray; Meera P. Narasimhan

(57) ABSTRACT

Numbers of servers at latter stage services are synchronized with arrivals of customers at the latter stage services. Detecting entering customers' entries and passages by intermediate points are communicated to a computer. The computer predicts arrivals of customers for the latter stage services and needs for increases or decreases in numbers of servers. Lead times allow changing numbers of servers at the latter stage services to meet changing needs. Detections of times of servers with customers and detections of arrivals of customers at the latter stage services are communicated to the computer aid the estimations of changed requirements for numbers of servers. The computer provides the estimations of server requirement changes to managers and automated controllers with sufficient lead time to facilitate smooth transitions in increasing or decreasing the numbers of servers. Wait lines at checkout registers, call center on-hold times and inter-computer communication delays are avoided.

20 Claims, 1 Drawing Sheet

(56) References Cited

U.S. PATENT DOCUMENTS

| | | | |
|---|---|---|---|
| 8,516,586 B1* | 8/2013 | Jensen | H04L 63/1425 713/153 |
| 9,154,366 B1* | 10/2015 | Martin | H04L 29/08072 |
| 2002/0062454 A1* | 5/2002 | Fung | G06F 1/3203 713/300 |
| 2003/0187708 A1* | 10/2003 | Baydar | G06Q 10/04 705/7.29 |
| 2005/0108582 A1* | 5/2005 | Fung | G06F 1/3203 713/300 |
| 2006/0218270 A1* | 9/2006 | Migita | G06Q 10/04 709/224 |
| 2007/0078606 A1* | 4/2007 | Cherepinsky | G06F 19/20 702/20 |
| 2007/0240006 A1* | 10/2007 | Fung | G06F 1/32 713/323 |
| 2007/0300083 A1* | 12/2007 | Goodrum | G06F 1/3203 713/300 |
| 2008/0065490 A1* | 3/2008 | Novick | G06Q 30/02 705/14.26 |
| 2009/0144568 A1* | 6/2009 | Fung | G06F 1/3203 713/300 |
| 2009/0182605 A1* | 7/2009 | Lappas | G06Q 30/04 705/34 |
| 2010/0218192 A1* | 8/2010 | Dunn | G06Q 10/0631 718/104 |
| 2012/0089664 A1* | 4/2012 | Igelka | G06F 9/5083 709/203 |
| 2012/0120798 A1* | 5/2012 | Jacquet | H04L 43/0882 370/230 |
| 2012/0265597 A1* | 10/2012 | Saha | G06Q 30/02 705/14.28 |
| 2013/0027561 A1* | 1/2013 | Lee | G06Q 30/02 348/150 |
| 2013/0030875 A1* | 1/2013 | Lee | G06Q 10/06311 705/7.38 |

* cited by examiner

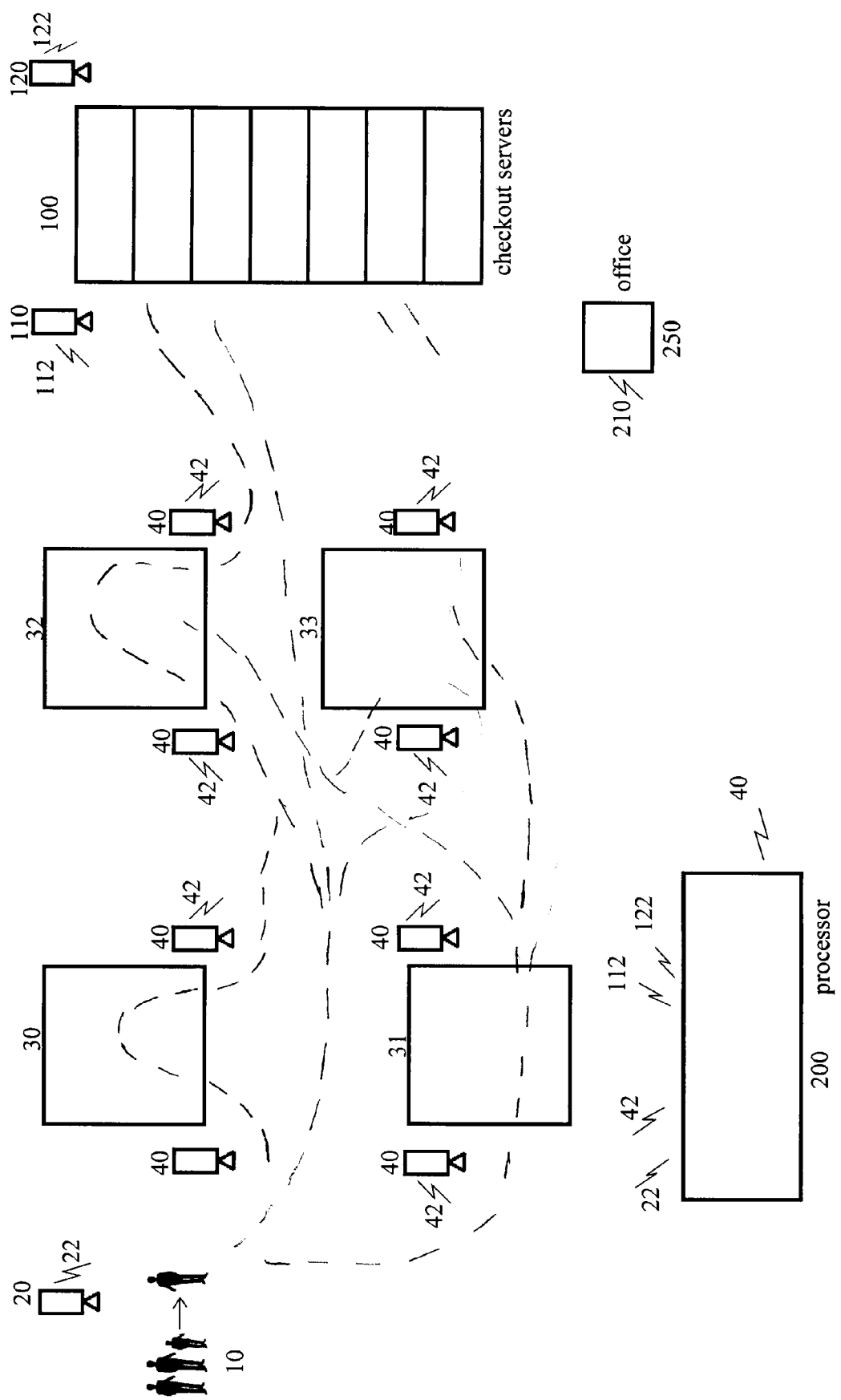

ADJUSTING, SYNCHRONIZING AND SERVICE TO VARYING RATES OF ARRIVAL OF CUSTOMERS

This application claims the benefit of U.S. Provisional Application No. 61/670,727 filed Jul. 12, 2012 and U.S. Provisional Application No. 61/673,896 filed Jul. 20, 2012, which are hereby incorporated by reference in its entirety as if fully set forth herein.

FIELD OF THE INVENTION

This invention pertains to systems in which customers enter at random, receive some form of ample service, and then proceed to a set of servers for another form of service.

BACKGROUND OF THE INVENTION

In many systems of this nature, one or more persons managing the system attempt to maintain a balance between cost and customer inconvenience by adjusting, by judgment in response to observed conditions, the number of servers available at the last stage of service. In the retail store, for example, some store personnel may divide their time between serving as cashiers and some other duties. When queues build up at the cashier stations, managers summon some of these store personnel to suspend other tasks and serve as cashiers. When offered customer traffic is light, managers reassign some store personnel to close down their cashier stations and perform other tasks.

An example of such a system is a retail store, wherein the first stage (or stages) of service consists of shopping, and the subsequent (last) stage of service consists of checkout and payment at a cashier's station.

Another example is a computer system or network with ample computer processing capacity but limited resources to output results of computation, so that queuing and delays occur for jobs awaiting output processing.

Management systems dependent on observation and judgment often result in having the number of servers and the resulting waiting lines oscillate between under-utilization of servers and full utilization of servers while customer queues lengthen. That system behavior results primarily because some lead time is required from when a decision is made to reassign a server and the actual change in what the person or resource is doing. In addition, in many systems, delays in the manager's recognition of the changing situation contribute further to keeping the system out of synchrony with the customer traffic.

SUMMARY OF THE INVENTION

To improve the performance of systems of this type, the invention applies principles of operations research, management science and related disciplines, especially queuing theory and automatic control. An automated system, operating on a computer computes and updates estimates of durations of key activities and uses these estimates to calculate when more or fewer servers will likely be required. The new system orders, or prompts human managers to order, the appropriate reassignments.

In a system that is usually in steady state, that is one in which probability distributions of key characteristics change infrequently, queuing theory further indicates that substantial synchronization of demand and service is achieved even without precise information about the durations of key activities.

If, for example, the arrival of customers to the overall system follows a Poisson process, which means that customers arrive randomly at a rate that is constant in any small time interval, then the probability distribution of the time between customer arrivals has an exponential distribution, with a mean equal to the reciprocal of the arrival rate. In addition, knowledge of the entire history of the Poisson process to date adds no information to the predicted time period until the next arrival. For this reason, such a process is called "memoryless." Memoryless interarrival and service times are often assumed in the queuing literature, partly because this assumption makes mathematical calculation simpler and partly because this assumption is a "worst case" in terms of what information, if available, is useful. Thus any control method that offers improvements when all the key events are memoryless can be expected to work well in a variety of actual situations.

If interarrival times, durations of the first stage of service (e.g. shopping), and time required for service by the second-stage server (e.g. cashier) are all memoryless, and if the rate of arrivals changes from time to time (so the arrivals form what is known as a non-homogeneous Poisson process), queuing theory indicates that the arrival rate at the final stage of service will change to a degree exactly commensurate with the change in the arrival rate to the system, commencing, on average, x time units after the change in arrival rate to the system occurs, where x is the expected duration of the first stage(s) of service. In the retail example, this means that the demand for cashiers can be expected to increase as the number of people shopping increases, and that a sharp, substantial increase in the number of shoppers entering the store will be reflected at the cashier stations, at a time, on average, equal to the sum of the time when the arrival rate increased plus the expected duration of shopping.

This solution can be refined by identifying different classes of customers, estimating durations of shopping for each class, and using a weighted average of these durations to compute the estimate of increased demand at the final stage of service. Thus, for the retail store, customers who pick up a shopping cart when entering the store are likely to display significantly longer durations of shopping than those who pick up a hand basket. Monitoring movement within the store, and/or which department shoppers enter, could provide additional information that would improve the estimates and hence improve the resulting synchronization of service capacity and offered demand.

The solution is refined further by updating estimates of key characteristics in real time, based on observation of actual current behavior, and thereby frequently adjusting the anticipation of customer demand based on changing conditions. Thus if, for example, customers arriving at 6 pm exhibit different durations of shopping, on average, from those who arrived at 5 pm, the system takes this change into account and compensates for it accordingly.

The current invention, however, also incorporates improved methods, only recently available for applications of the nature of observing and identifying the customer classes and associated behaviors. Such methods include scanning RFID (radio frequency identification) devices in shopping carts and hand baskets, real-time monitoring of withdrawals from store on-shelf inventories at selected locations, video monitoring and motion detection of customer traffic at selected points, and integration of data from the computerized checkout with other information. Thus, the present invention takes advantage of the data and data collection methods of the venue of the application, as well as operations research and a related discipline. Also, in the prior art, considerable experimentation is often required to find good smoothing constants to balance the new information against past values, to adjust as quickly as possible without over-reacting and inducing oscillation, Extensive analysis of data specific to the applications of interest yields a substantial improvement over the prior art.

In addition, prior art for control of multi-server systems has generally relied on the assumption that servers are probabilistically identical for probalistically identical customers. That is, there may be classes of customers, each class having its own probability distribution of duration of service, but these distributions are assumed not to vary depending on which specific server the customer utilizes. In actual systems, however, there are often consistent variations among servers in average duration of service for customers in the same service class. These differences reflect both random variation and differences among servers. To make best use of methods that involve estimating durations of service and using those estimates in automatic control, one needs an appropriate way of correcting estimates for variations among servers.

The invention employs statistical estimation, specifically Bayesian estimation. A theoretically sound and practically robust method for such estimation is a James-Stein shrinkage estimator. Such estimators were first proposed by James and Stein in 1956 and were well described at the level of persons skilled in basic statistics.

The estimator is computed via the mathematical formula $$\hat{\theta}_{JS} = \left(1 - \frac{(m-2)\sigma^2}{\|\bar{y}\|^2}\right)\bar{y}.$$

where m is the number of servers, $\bar{y}$ is the vector of mean durations of service for the individual servers, and $\sigma^2$ is the variance of durations of service. If $\sigma^2$ is not known, an estimate is used instead.

While the theoretical properties and desirable qualities of such estimators are known, there are apparently no prior disclosed applications of these methods in automatic control for systems such as those contemplated in the present invention.

The new method is used in a multi-stage service system to synchronize numbers of servers at a latter stage of service with rates of arrivals of customers at said latter stage. Entries of customers into the system, passages of customers by intermediate points in the system, and arrivals at the latter stage of service are detected and are communicated to a computer processor. The processor counts said detectings and computes rates of movement by the detectings of the entries and the detectings of the passages by the intermediate points. The processor computes, with frequent updates, durations of times between the arrivals and the passages by the intermediate points, and the arrivals at the latter stage of service. The processor computes rates of service at the latter stage of service depending on the number of servers active at the latter stage. The processor produces estimated changed requirements for more or fewer of the servers at the latter stage, and estimates times when changed requirements are predicted to occur. The processor produces recommendations to an automated controller or human managers for increases or decreases in numbers of servers, with sufficient lead time to facilitate smooth transitions in implementing the recommendations.

In one embodiment, the multi-stage server system is a multi-department retail establishment and the latter stage of service is a multiple server checkout. In one embodiment, the multi-stage server system is an inbound contact center, which may include automated responses, and the latter stage of service is live connections to highly skilled representatives. One multi-stage server system has a network of computers, and the latter stage of service is a critical and constrained process, such as actionable output.

Computing rates of service at the latter stage of service takes into account persistent differences in speed among servers, balancing the differences against general random variation.

In one embodiment, the computing and producing estimates uses Bayesian estimation techniques such as James-Stein shrinkage estimators.

The apparatus includes first detectors for detecting entries of customers and first communicators connected to the first detectors for communicating customer entry information, second detectors for detecting passage of the customers by intermediate points and second communicators connected to the second detectors for communicating customer intermediate point passage information, and plural servers for latter stage servicing of the customers.

A receiver is connected to the processor for receiving the customer entry information and the customer intermediate point passage information for providing the customer entry information and customer point passage information to the processor. Software in the processor processes the customer entry information and the customer intermediate point passage information and predicts requirements of numbers of the plural servers for serving the customers before arrival of the customers at the servers. An output of the processor produces recommendations for increasing or decreasing the numbers of the plural servers which are activated for arrival of the customers.

In some embodiments, the first and second communicators are first and second transmitters, and the first and second detectors, the first and second transmitters, the receiver, the processor and the servers are located in a multiple department retail establishment and the servers further comprise check out stations. The first detectors and the transmitters are positioned at entry points to the establishment. The second detectors and transmitters are located at varied positions within the establishment.

In some embodiments, multiple carriers used by customers in the establishment have identification indicators on the carriers, and the first and second detectors are adapted to detect the identification indicators. The multiple carriers have different load capacities. The identification indicators have indications of the load capacities of the carriers which are detected by the first and second detectors and transmitted to the receiver by the first and second transmitters.

In an example, a multiple stage customer service system has entries to the system and exits from the system, intermediate points within the system, and servers near the exits. Detectors are provided near the entries, near the intermediate points and near the servers. The system includes a processor. Communicators are connected to the detectors near the entries, the intermediate points in the system. The communicators communicate to the processor detections of customer entries and passages by the intermediate points in the system and activity at the servers. Software in the processor receives the detections and produces estimates of changed requirements for activation of numbers of the servers.

In one embodiment, the multistage server system is an inbound contact center, the entries receive calls, and the intermediate points are prerecorded questions, customers' answers to the questions and automated responses. The servers are connections to representatives. One multi-stage server system is a network of computers, and the servers are critical and constrained processes. Another multi-stage server system is a network of computers, and the servers are actionable outputs.

Inputs include persistent differences in speed among the servers. The software is adapted for balancing the differences against general random variation.

Some of the software is uses Bayesian estimation techniques and/or James-Stein shrinkage estimators.

To the extent that data deemed reliable are available, the method includes combining data on current movements of customers with past data indicating patterns that vary by time of day, day of week, time of year, and similar considerations. In a preferred embodiment, Bayesian updating methods are used for this purpose. Any other statistical methods of estimation may be employed without departing from the scope of this invention.

The method can be expanded additionally, without departing from the scope of this invention, via the use of other means of capturing indications of where customers may go. Such means include additional sensors, such as RFID transmitters in shopping carts; and one or more kiosks near the entrance that provide directions to different shopping areas and captures, from these interactions, which areas the customer indicates interest in visiting.

These and further and other objects and features of the invention are apparent in the disclosure, which includes the above and ongoing written specification, with the claims and the drawings.

BRIEF DESCRIPTION OF THE DRAWINGS

FIG. 1 is a schematic representation of an example of the invention.

DETAILED DESCRIPTION

As shown in FIG. 1, customers 10 arrive, passing by sensor 20. Via a RF communications link 22, said sensor 20 communicates to processor 200 the sensor's detections of customers. Similarly, as customers progress toward areas 30, 31, 32 and 33, which are different areas in which customers obtain stages of service, sensors 40, via their communication links 42, communicate to processor 200 the customers' passage by selected points. In a preferred embodiment, these service areas are different departments of a retail establishment. Finally, as customers progress to final stage of service 100, sensors 110 communicate, via links 112, the customers; arrivals at and departures from said final stage of service. In a preferred embodiment, said final stage of service is a multi-lane checkout.

Processor 200 tracks the rates of customers' arrivals at specified points and performs frequently updated statistical estimation of durations of service in different stages 30 through 33, and travel times between sensor points, to derive a prediction of when a substantial increase or decrease in the rate of arrivals at final stage 100 will occur. Using communications link 210, processor 200 communicates to office or control center 250 the anticipated change in the number of servers at stage 100 needed to maintain desired level of service, i.e. short queues, with sufficient lead time to facilitate smooth transitions in adding or subtracting servers, synchronized with the changes in arrival rates at the final stage.

While the invention has been described with reference to specific embodiments, modifications and variations of the invention may be constructed without departing from the scope of the invention, which is defined in the following claims.

We claim:

1. A method for synchronizing numbers of servers at a latter stage of service in a multi-stage service system with rates of arrivals of customers at said latter stage, comprising:
   a. detecting entries of customers into the system, detecting passages by intermediate points in the system, and detecting arrivals at the latter stage of service;
   b. communicating the detectings in real-time to a computer processor;
   c. counting the detectings and computing rates of movement by the detectings of the entries and the detectings of the passages by the intermediate points;
   d. computing, with frequent updates, durations of times between the entries and the passages by the intermediate points, and the arrivals at the latter stage of service, and updating estimates of key characteristics in real-time based on observation of actual current behavior of each of the customers and thereby adjusting anticipation of customer demand based on changing conditions;
   e. computing rates of service at the latter stage of service depending on the numbers of servers active at the latter stage;
   f. producing estimated changed requirements for more or fewer of the servers at the latter stage, and producing estimates of times when the estimated changed requirements are predicted to occur;
   g. providing recommendations to an automated controller or to a human manager for increases or decreases in the numbers of the servers with sufficient lead times to facilitate smooth transitions in implementing the recommendations; and
   h. synchronizing numbers of servers at the latter stage of service in the multi-stage service system with rates of arrivals of customers at said latter stage.

2. The method of claim 1, in which the multi-stage server system is a multi-department retail establishment and the latter stage of service is a multi-server checkout.

3. The method of claim 1, in which the multi-stage server system further comprises an inbound contact center, which may include automated responses, and the latter stage of service is live connections to highly skilled representatives.

4. The method of claim 1, in which the multi-stage server system further comprises a network of computers, and the latter stage of service is a critical and constrained process.

5. The method of claim 1, in which the method of computing rates of service at the latter stage of service takes into account persistent differences in speed among servers, balancing said differences against general random variation.

6. The method of claim 5, in which the method of computing further comprises estimation technique selected from a group consisting of Bayesian, James-Stein shrinkage estimators, and combinations thereof.

7. An apparatus comprising:
   first detectors for detecting entries of customers,
   first communicators connected to the first detectors for communicating customer entry information,
   second detectors for detecting passage of the customers by intermediate points,
   second communicators connected to the second detectors for communicating customer intermediate point passage information and updating estimates of key characteristics in real-time based on observation of actual current behavior of each of the customers and thereby adjusting anticipation of customer demand based on changing conditions, plural servers for latter stage servicing of the customers, a processor coupled to memory, a receiver connected to the processor for receiving the customer entry information and the customer intermediate point passage information and providing the customer entry information and customer point passage information to the processor, software in the processor for processing the customer entry information and the customer intermediate point passage information and predicting requirements of numbers of the plural servers required for serving the customers before arrival of the customers at the servers, an output connected to the processor for producing recommendations for increasing or decreasing the numbers of the plural servers which are activated for arrival of the customers, and an automated control responsive to the output synchronizing the numbers of the servers at a latter stage of service in a multi-stage service system with rates of arrivals of customers at said latter stage.

8. The apparatus of claim 7, wherein the first and second communicators are first and second transmitters, and wherein the first and second detectors, the first and second transmitters, the receiver, the processor and the servers are located in a multiple department retail establishment and the servers further comprise check out stations.

9. The apparatus of claim 8, wherein the first detectors and the transmitters are positioned at entry points to the establishment, and wherein the second detectors and transmitters are located at varied positions within the establishment.

10. The apparatus of claim 9, further comprising multiple carriers used by customers in the establishment and identification indicators on the carriers, and wherein the first and second detectors detect the identification indicators.

11. The apparatus of claim 10, wherein the multiple carriers have different load capacities and the identification indicators have indications of the load capacities of the carriers which are detected by the first and second detectors and transmitted to the receiver by the first and second transmitters.

12. An apparatus comprising a multiple stage customer service system, further comprising:

entries of customers to the system and exits from the system, intermediate points within the system between the entries and the exits, servers near the exits, detectors near the entries, near the intermediate points in the system and near the servers, a processor coupled to a memory in the system, communicators connected to the detectors near the entries and near the intermediate points in the system to communicate to the processor detections of passages through the entries and passages by the intermediate points in the system and activity at the servers and updating estimates of key characteristics in real-time based on observation of actual current behavior of each of the customers and thereby adjusting anticipation of customer demand based on changing conditions, software in the processor to receive the detections from the detectors near the entries, the intermediate points and the servers and to produce an output with estimates of changed requirements for activation of numbers of the servers, and automated controls responsive to the output synchronizing the numbers of the servers at a latter stage of service in a multi-stage service system with rates of arrivals of the customers at said latter stage.

13. The apparatus of claim 12, in which the multistage server system further comprises an inbound contact center, wherein the entries comprise received calls, wherein the intermediate points comprise automated responses, and wherein the servers are live connections to highly skilled representatives.

14. The method of claim 1, in which the multi-stage server system further comprises a network of computers and the servers are critical and constrained processes.

15. The method of claim 1, in which the multi-stage server system further comprises a network of computers and the servers are actionable outputs.

16. The method of claim 1, further comprising inputs of persistent differences in speed among the servers.

17. The method of claim 1, further comprising inputs of persistent differences in speed among the servers, and wherein the software balances the differences against general random variation.

18. The method of claim 16, in which the software estimation is done with Bayesian estimation techniques.

19. The method of claim 16, in which the software estimation is done with James-Stein shrinkage estimators.

20. The method of claim 4, in which the process is an actionable output.

* * * * *